May 5, 1931.  J. WOLF  1,804,298

SEALING DEVICE

Filed July 17, 1929

Inventor:—
Jacques Wolf
by Langner, Parry, Card & Langner
Attys.

Patented May 5, 1931

1,804,298

UNITED STATES PATENT OFFICE

JACQUES WOLF, OF BASEL, SWITZERLAND

SEALING DEVICE

Application filed July 17, 1929, Serial No. 379,043, and in Germany July 30, 1928.

The present invention relates to a sealing device with a drip scoop for the sealing wax. The device is characterized by the scoop being pivoted with a slight excess weight at the rear to a heating head in such a manner that it is applied to the heating head by pressure of the stick of sealing wax to melt the latter, and is held against the heating head during downward movement of the stick of wax along the scoop to scrape off the molten material until the stick of wax slides off the scoop and the latter can swing back upwards into its position of rest.

The accompanying drawing illustrates an example embodying the invention.

Figure 1:
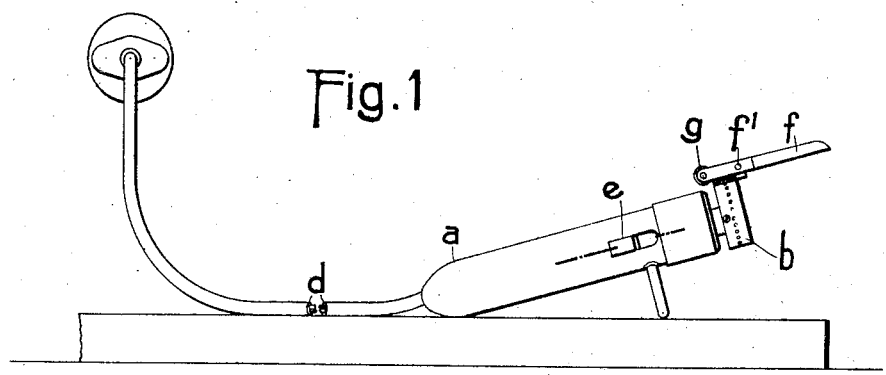
Figure 1 is a side view.
Figure 2:
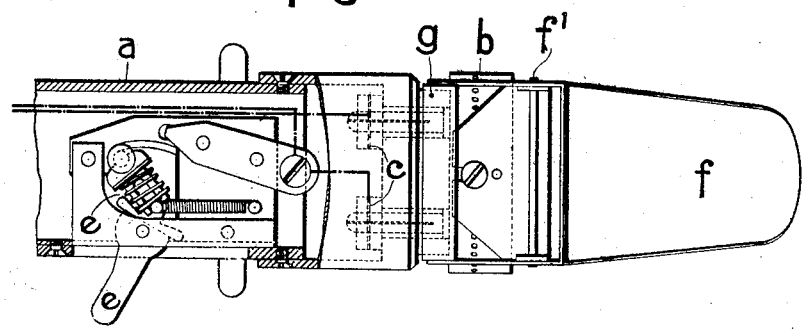
Figure 2 is a plan view of a portion of the device, shown partly in section, on an enlarged scale.

At the front end of a handle-like hollow rod $a$ is an electric heating head $b$ within which is a heating resistance connected to terminals $c$. The current is led to these terminals over a cable $d$ passing into the hollow rod $a$ and is controlled by a snap switch $e$. A drip scoop $f$ for the sealing wax is pivoted at the top of the heating head $b$ at $f'$. Rotation of the scoop on its pivot is opposed by a counterweight $g$. Owing to this counterweight the scoop $f$ normally takes the raised position shown in Figure 1. By pressing the rod of sealing wax on the scoop $f$, the latter is swung downwards and bears against the heating head $h$, and the wax is melted by the heat communicated from the head $b$ to the scoop $f$, and drips off. The scoop is still held against the heating head $b$ while the stick is moved downwards along the scoop to scrape off the molten material until it slides right off the scoop. At this instant the scoop $f$, from which as much as possible of the molten material has been scraped off, returns to its normal position under the action of the counterweight $g$.

What I claim is:—

1. A sealing device comprising a heating head and a drip scoop for the sealing wax in combination with tilting means for said drip scoop, said drip scoop being so arranged as to be capable of being applied to the heating head when pressing the wax stick thereon and sliding same down along the scoop and of automatically returning to normal position when the wax stick slides right off the scoop.

2. A sealing device comprising an electric heating head and a drip scoop for the sealing wax pivoted on said head and having a tilting weight to rock it away from said head, said drip scoop being so arranged as to be capable of being applied to the heating head when pressing the wax stick thereon and sliding same down along the scoop and of automatically returning to normal position when the wax stick slides right off the scoop.

In witness whereof I have hereunto signed my name this 6th day of July, 1929.

JACQUES WOLF.